H. B. BYRON.
OPTICAL PRINTER.
APPLICATION FILED MAR. 8, 1919.
1,351,618.
Patented Aug. 31, 1920.
4 SHEETS—SHEET 4.
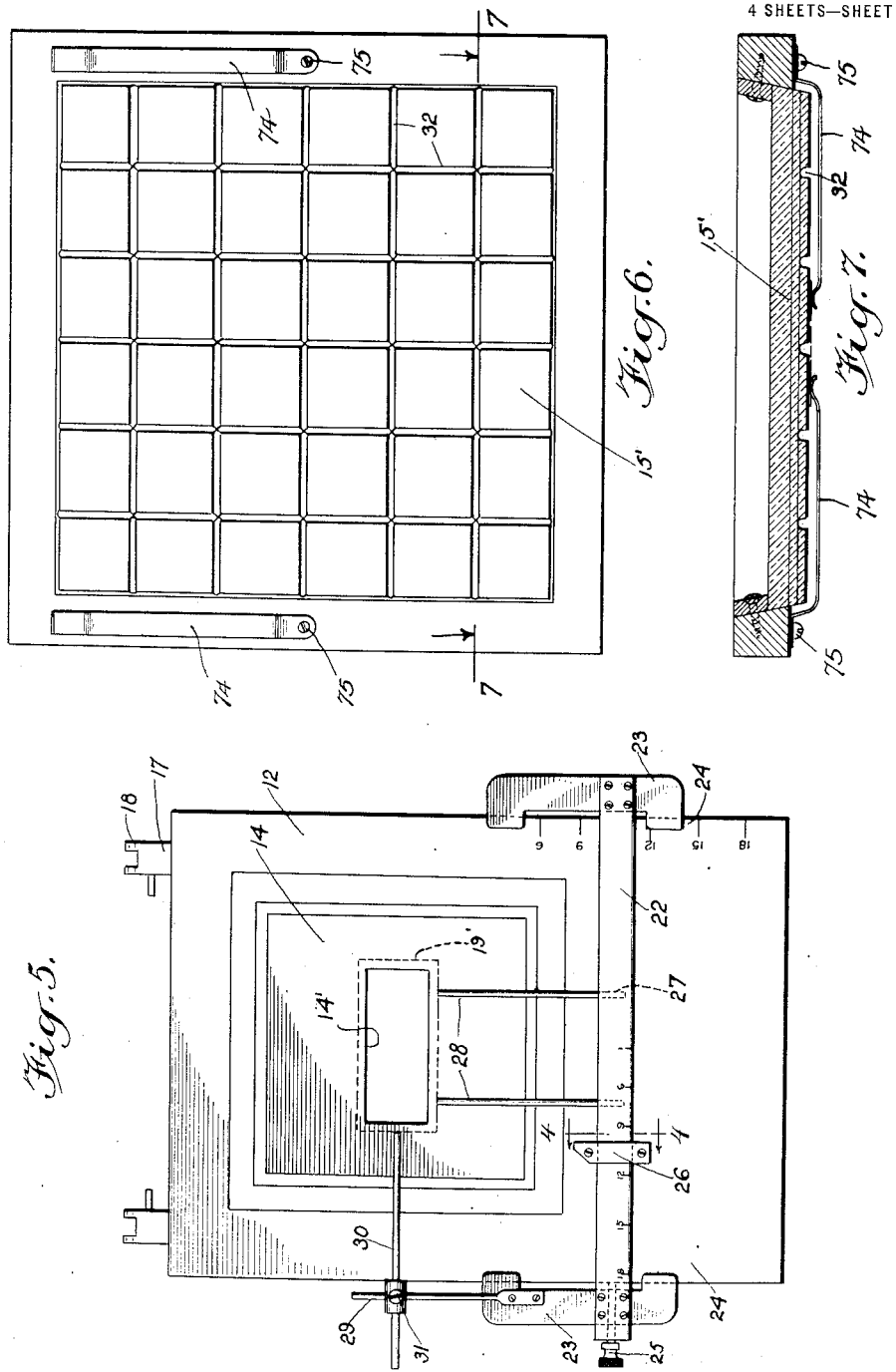

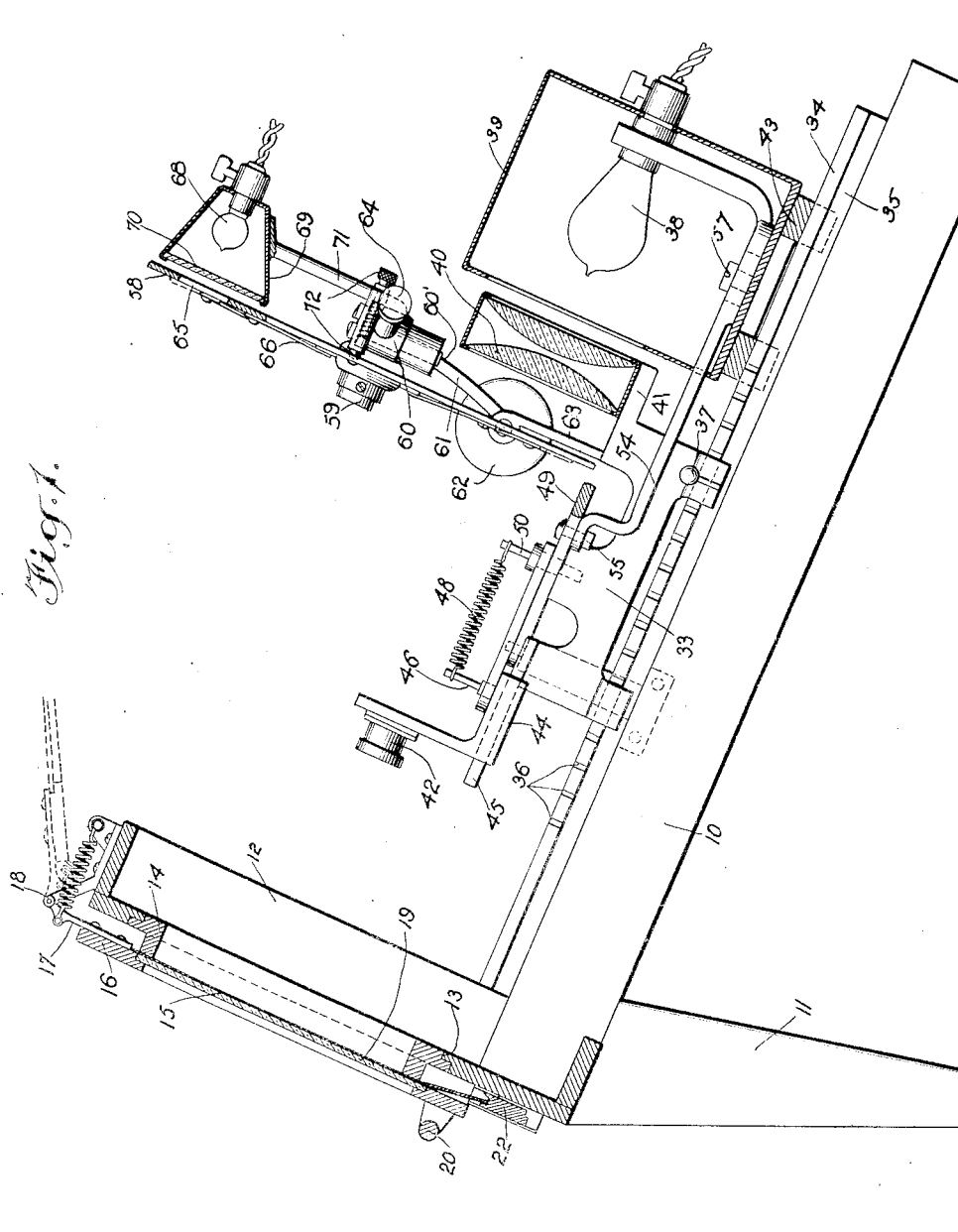

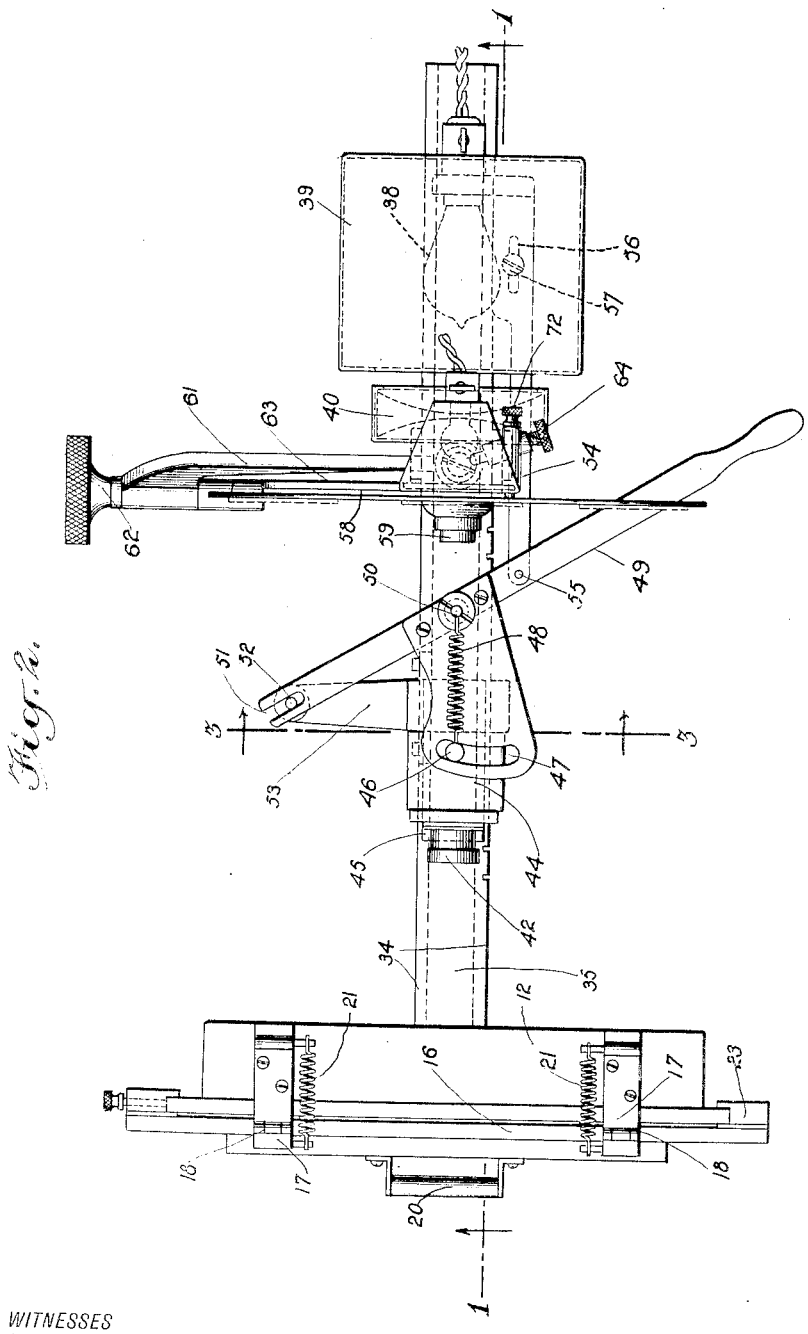

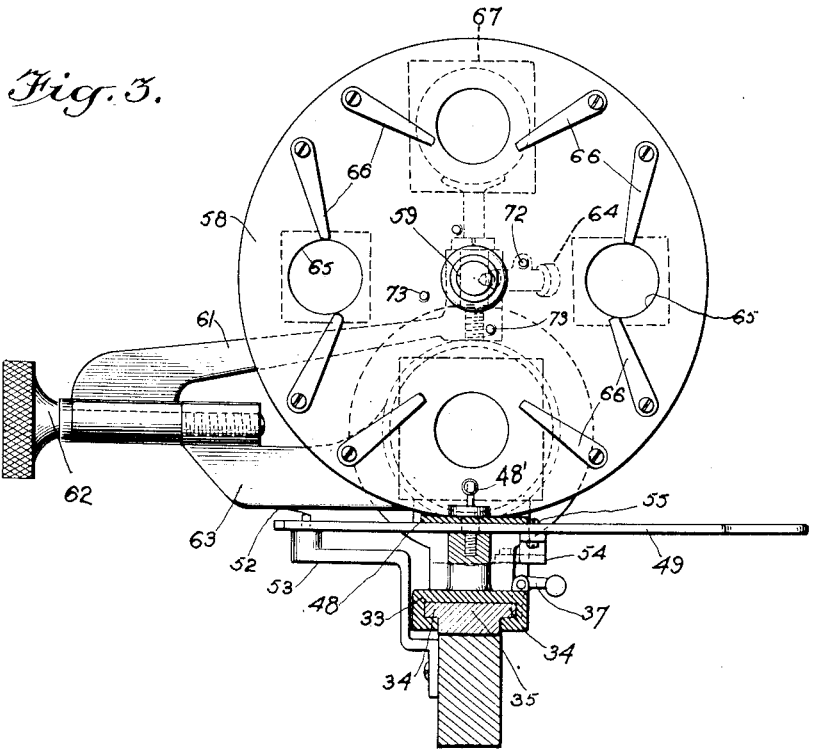
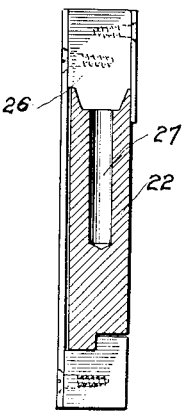

UNITED STATES PATENT OFFICE.

HAGAR BOLTON BYRON, OF NEW YORK, N. Y.

OPTICAL PRINTER.

1,351,618.  Specification of Letters Patent.  Patented Aug. 31, 1920.

Application filed March 8, 1919. Serial No. 281,417.

*To all whom it may concern:*

Be it known that I, HAGAR BOLTON BYRON, a citizen of the United States, and a resident of the city of New York, borough of the Bronx, in the county of Bronx and State of New York, have invented a new and Improved Optical Printer, of which the following is a full, clear, and exact description.

This invention relates to photoprinting machines or devices and has particular reference to machines having a fixed optical center.

Among the objects of the invention is to provide a negative holder having a plurality of light apertures adapted to be brought in succession into the axis of the light with facility and optical precision, means being provided to set up or adjust the negatives with ease and facility in or at the apertures remote from the focal axis whereby a more rapid or more perfect adjustment may be effected than would ordinarily be possible in previous or known machines.

Another object of the invention is to provide a negative holder in the nature of a disk rotatable around a substantially fixed axis and provided with a circular series of light apertures arranged equidistant from the axis of the disk, the disk having preferably an even number of light apertures so that a negative may be adjusted or set up on the disk at the aperture diametrically opposite the focal axis, the arrangement being such that when the negative is so set up it may be positioned in an upright manner whereby the operator may have a more satisfactory view or control thereof and then when the disk is turned through 180 degrees the negative is brought directly into accurate position for projection or printing.

A still further object of the invention is to provide a negative holder so related to the focal axis of the machine as to be adjustable universally around axes perpendicular to the focal axis and to each other for the purpose of rectifying any linear distortions that may be inherent in a negative and yet without distrubing the proper alinement or position of the negative with respect to the focal axis.

Another object of the invention is to provide a printing machine so inclined that the back whereon the sensitized paper or the like is supported will be in an inclined plane for the highest degree of efficiency in the printing operation and convenience to the operator, the focal axis of the projector being similarly inclined so as to be located at right angles to the paper supporting back.

Another object of the invention is to improve the construction of the back with respect not only to the convenience in manipulation of the paper, but also in the facility for giving access to or the holding of the paper irrespective of the size or form of the print to be made.

Another object of the invention is to provide an adjusting device for the three principal optical features, namely, the lamp, the condenser and the objective, as to give the proper ratios of adjustment for all of these several principal features automatically and by a single adjustment of a manually controlled device.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of my improved printing machine substantially on the line 1—1 of Fig. 2.

Fig. 2 is a plan view of the machine, or more accurately looking in a direction perpendicular to the focal axis thereof.

Fig. 3 is a rear elevation of the negative holder with parts in section substantially on the line 3—3 of Fig. 2.

Fig. 4 is a vertical sectional detail on the line 4—4 of Fig. 5.

Fig. 5 is a rear elevation of a modified form of back structure showing especially the adjustable means for receiving and holding paper for small prints.

Fig. 6 is a face view of the translucent back used in connection with the devices shown in Fig. 5; and Fig. 7 is a horizontal sectional view of the same on the line 7—7.

Referring now more specifically to the drawings my apparatus includes a main support or table 10 inclined at approximately 30 degrees to the horizontal and having rear supporting legs 11 while the front end of the table rests directly upon any base or foundation suitable for the operation of the apparatus. At the rear end of the table is a frame 12 substantially rectangular in form and located in a plane perpendicular to the main portion of the table 10, and hence having its top inclined forward at a suitable angle. This frame 12 is provided with a rabbeted opening 13 in which is fitted any suitable printing field or kit 14 and over the back face of which a ground glass or other suitable platen 15 operates. This platen is shown as comprising a frame 16 having hinges 17 connected through horizontal pivots 18 to the top of the frame 12, the location of the pivots being such that the front or active face of the platen will lie flat against the kit or sheet of printed paper 19 held thereupon. A handle 20 near the lower edge of the platen enables the operator to lift and to swing the platen upward through about 90 degrees around the axis of the pivots 18. One or more springs 21 extend between the fixed portion of the frame 12 and the movable platen and serve to hold the platen in either its closed operative position or elevated out of the way of the operator. When the platen is swung upward the lines of force between the points of connection of the springs pass upward above the axis of the pivots and thereby the springs serve to hold the platen elevated until it is lowered again by hand. The kit 14 may be provided with a slight opening 14' of any suitable form or size depending upon the description of the picture or the like to be produced. Obviously the kit is interchangeable with any other or different types of kits to produce the desired result. In all cases, however, the center or axis of the sight 14' will coincide with the optical center of the machine.

A large sheet of paper such as indicated at 19 in Fig. 1 may rest upon any suitable support at the lower portion of the frame 12 or kit 14, but preferably upon a horizontal guide or rail 22 to which end runners or arms 23 are rigidly connected at right angles and which are adjustable up or down along graduated portions 24 of the sides of the frame 12. A thumb screw 25 represents any suitable means to clamp the guide rail 22 at any desired elevation with respect to the focal axis of the machine. A laterally adjustable stop 26 is fixed to the rail 22 and has the function of locating the sheet of paper laterally with respect to the focal axis. In other words when the rail 22 and stop 26 are properly adjusted for pictures or sheets of paper of standard sizes the operator has but to apply the sheets to the rail and stop in succession and the inclination of the frame 12 will insure that the paper will stand in position for proper coöperation with the platen. Obviously the stop 26 may be removed if desired for any special work.

The rail 22 is provided with a plurality of open topped holes or sockets 27 into any of which a plurality of fingers 28 may be set, the upper ends of the fingers serving to support print sheets of small sizes at the proper elevation with respect to the focal axis as indicated in dotted lines at 19' in Fig. 5. The rail arm 23 at one side of the frame carries an upwardly projecting rod 29 parallel to the fingers 28 and to this rod is secured a horizontal finger 30 by a clamp 31, the free end of this finger 30 determining the adjustment of the sheet 19' laterally.

The front or active face of the platen 15' is provided preferably with a plurality of vertical and lateral grooves 32 having a number of important functions among which are the following: First, they constitute means to accommodate the fingers 28 and 30 during the printing operation without obstruction due to the thickness of said fingers. In other words with the fingers properly adjusted for any size or shape of card the platen will drop or be brought down directly against the paper to hold it steady and flat while the fingers will be received in the grooves of the platen. The guide rail 22 is not adjustable laterally and so the holes 27 therein are formed at proper intervals to insure that the fingers 28 will register with the vertical grooves 32. Likewise the finger 30 is adjustable to a proper position vertically to be received directly into the central horizontal groove 32. Secondly, the grooves 32 being formed in the translucent platen plate 15' are useful as guide lines for the operator in adjusting or positioning the image or any other portion of his work. Thirdly, the grooves in the platen serve as passages for air and so prevent the suction that might otherwise result incident to the lifting of the platen from lifting the paper. Thus the print sheet of paper will always stand in the position into which it is placed until lifted therefrom by the operator.

33 indicates what may be termed a carriage adjustable longitudinally along ways 34 formed on the parallel side edges of the track 35 along the upper surface of the main support 10. Either way 34 may be provided with holes or notches 36 with which a holding member or dog 37 may coöperate automatically to hold the carriage at any desired adjustment along the track 35.

My apparatus comprises means for supporting and controlling the relative positions of the three optical features, namely, a lamp 38 representing any suitable source of light in a casing or hood 39 at the front end of the carriage, a condenser 40 held in fixed position upon an extension 41 of the carriage, and an objective lens 42 located nearest to the platen. The light hood is supported upon a base 43 having slidable engagement with the ways 34. The objective 42 is carried by a shoe 44 slidable along an extension 45 of the carriage parallel to the ways and a stud 46 projects upward from the shoe 44 through a cam slot 47 formed in a plate 48 fixed rigidly to a focusing bar 49 which is adapted to swing around a stud or pivot 50 projecting upward from the carriage and in a plane parallel to the ways 34. The end of the bar 49 opposite the handle end thereof is slotted at 51 for coöperation with a fulcrum 52 supported on the outer end of a rigid bracket 53 carried on any suitable fixed support such as the support 10. A link 54 pivoted at one end at 55 to the bar 49 and connected through a slot 56 and pin 57 at its other end to the base 43 of the lamp casing serves to adjust the light longitudinally when the bar 49 is swung on its fulcrum. A spring 48' anchored to the pins 46 and 50 serves to hold the pin or stud 46 of the shoe 44 against the front wall or edge of the cam slot. It will thus be seen that from the construction of the focusing bar and its connections a swing of the bar toward the left in Fig. 2 around the fixed fulcrum 52 will cause simultaneous adjustment of all of the operative features in the same direction, but to different extents according to the differences of such adjustment that are required in the proper adjustment of a machine of this character. Whereas ordinarily the focusing of a device of this sort demands that the several parts be adjusted in succession with extreme care, I have devised a means whereby all adjustments may be made at the same time and with geometric precision. More specifically stated the action of the bar 49 will adjust the carriage through the pin or pivot connection 50 carrying with it the condenser 40, the link 54 at this time will draw the lamp casing and lamp along in the same direction but to a slightly greater extent, and while the shoe 44 is adjusted in the same direction by means of the bar 49 the throw of the cam 47 will vary the actual extent of the adjustment of the objective 42 in a proper ratio.

Mounted upon the carriage 33 is the negative holder 58 above referred to as being shown in the form of a disk pivoted centrally on a trunnion 59 constituting a part of a knuckle joint 60 adjustable around a vertical axis upon an arm 61. This arm is mounted upon a horizontal axis determined by a clamping screw 62, the axis of which is in the horizontal line intersecting the focal axis of the machine and connected to a bracket 63 carried by the carriage. The axis of the pivot connection between the knuckle 60 and the arm 61 is perpendicular to the axis of the screw 62 and intersects the same in the focal axis. It follows, therefore, that the disk may be adjusted laterally around the axis 60' and locked in such adjustment by a set screw 64 and which may also be adjusted independently of the lateral adjustment around the horizontal axis of the screw 62 so as to tilt the top of the negative holder forward or rearward.

The holder 58 is provided with a plurality, preferably an even number, of apertures 65 having centers equidistant from the axis of the trunnion 59 and all adapted to pass in succession across the focal axis of the machine. Spring plates 66, or their equivalent, are employed to hold negatives, mats, trimmings, or the like, indicated by dotted lines at 67, upon the holder 58. The purpose of the lateral and vertical tilting or adjustment of the holder 58 is primarily to correct or rectify any linear distortions that may be inherent in negatives presented for reproduction or printing. In making this correction of a distorted negative it is only necessary to tilt the holder in an opposite direction. Obviously the rectification might be accomplished either by tilting the holder or the platen, but I show as a preferred means simply the tilting or adjustment of the holder. I wish to point out also that while I show a link adjustment for the lamp and a cam adjustment for the objective any other equivalent mechanical means might be employed for either or any of these adjustments.

68 is a setting-up light located in a casing 69 having a non-actinic ground glass plate 70 and held supported by means of a standard 71 opposite the uppermost aperture 65 of the holder or diametrically opposite the focal axis of the machine. This setting-up lamp 68 arranged as indicated serves to enable the operator to quickly and easily position the negative or any devices used in connection therewith in a manner free from obstruction along the optical axis and furthermore it enables the operator to adjust his work in upright position, a feature that is always more satisfactory than to manipulate the negative in inverted position. During this adjustment of a negative or the like, or during the practice of the machine, the holder is held stationary or from rotation around the trunnion 59 by means of a spring pressed pin 72 snapping into any one of a series of holes or depressions 73 formed in the disk adjacent to the trunnion and properly spaced to accord with the several apertures 65. After the adjustment of the negative has been made at the setting-up light the holder may be turned around to bring the negative into proper projecting position in the focal axis where the holder will be again locked by the pin 72. The proper adjustments having been made the operator will then be at liberty to proceed easily and rapidly with the printing operation back of the frame 12 and platen.

The member or frame 14 has a rearwardly projecting rim 14ª against which the printing paper is adapted to be held by the movable platen for the purpose of holding it in a much more favorable position for printing than would otherwise be possible. The platen above mentioned, in addition to its function as a binder or holder for the printing paper, is adapted, because of its translucency, for direct focusing purposes. I wish to point out also in connection with Figs. 6 and 7 that the platen is preferably provided with one or more spring fingers or clips 74 connected in any suitable manner to the platen as by means of pivots 75, and which are useful for the purpose of holding strips or bits of test paper against the front or inner face of the platen in the making of preliminary exposures so that proper timing of the printing operation may be performed directly. When not in use these fingers occupy nested positions along the frame of the platen.

I claim:

1. In a machine of the character set forth, the combination of a frame, a guide bar extending across the lower portion of the frame, means to adjust and hold the bar at any desired elevation with respect to the focal axis of the frame, a plurality of fingers carried by and adjustable with the bar for accurately receiving and holding sheets of print paper, and a platen movable toward and from the frame into direct contact with the paper and having grooves to receive said fingers without obstruction.

2. In a photoprinting machine, the combination with a series of optical units having a fixed axis, of a negative holder having a plurality of apertures adapted to be brought selectively into said focal axis, and setting-up means for a negative adjacent to a portion of said holder remote from the focal axis preliminary to the bringing of such negative into projecting position, said setting-up means including a light and a casing for the light having a non-actinic ground glass plate.

3. In an optical printer, the combination with a plurality of optical units defining a fixed optical axis, of a negative holder rotatable around an axis parallel to the optical axis and having a plurality of apertures adapted to be brought in succession or selectively into said optical axis, means normally holding said holder from rotation, and means to tilt the holder laterally or longitudinally to correct linear distortions in the negative while that portion of the negative in the optical axis of the machine remains substantially fixed.

HAGAR BOLTON BYRON.